US012403565B2

(12) United States Patent
Hidde et al.

(10) Patent No.: US 12,403,565 B2
(45) Date of Patent: Sep. 2, 2025

(54) ABRASIVE FOR JET CUTTING

(71) Applicant: VULKAN INOX GMBH, Hattingen (DE)

(72) Inventors: Marc Hidde, Ennepetal (DE); André Hahn, Hattingen (DE)

(73) Assignee: VULKAN INOX GMBH, Hattingen (DE)

( * ) Notice: Subject to any disclaimer, the term of this patent is extended or adjusted under 35 U.S.C. 154(b) by 710 days.

(21) Appl. No.: 17/770,306

(22) PCT Filed: Dec. 3, 2020

(86) PCT No.: PCT/EP2020/084384
§ 371 (c)(1),
(2) Date: Apr. 20, 2022

(87) PCT Pub. No.: WO2021/110800
PCT Pub. Date: Jun. 10, 2021

(65) Prior Publication Data

US 2022/0410346 A1 Dec. 29, 2022

(30) Foreign Application Priority Data

Dec. 4, 2019 (DE) ..................... 10 2019 133 017.3

(51) Int. Cl.
*B24C 1/04* (2006.01)
*B24C 11/00* (2006.01)
*B26F 3/00* (2006.01)

(52) U.S. Cl.
CPC .............. *B24C 1/045* (2013.01); *B24C 11/00* (2013.01); *B26F 3/004* (2013.01)

(58) Field of Classification Search
CPC .................... C21D 2211/001; C21D 2211/008
See application file for complete search history.

(56) References Cited

U.S. PATENT DOCUMENTS

| | | | | |
|---|---|---|---|---|
| 2,863,790 | A * | 12/1958 | Chen | B22F 1/142 264/5 |
| 7,108,585 | B1 | 9/2006 | Dorfman | |
| 2003/0072971 | A1 | 4/2003 | Fukutani et al. | |
| 2006/0223422 | A1 | 10/2006 | Dorfman et al. | |
| 2009/0077801 | A1 | 3/2009 | Scarlin et al. | |
| 2014/0090222 | A1 | 4/2014 | Sawada | |
| 2016/0375549 | A1* | 12/2016 | Brodalla | C25D 11/18 451/38 |
| 2018/0202049 | A1 | 7/2018 | Duc | |

FOREIGN PATENT DOCUMENTS

| | | | | |
|---|---|---|---|---|
| CN | 100999806 | A | 7/2007 | |
| CN | 101381852 | A | 3/2009 | |
| CN | 101439500 | A | 5/2009 | |
| CN | 101469390 | A | 7/2009 | |
| CN | 101880833 | A | 11/2010 | |
| CN | 102286654 | A | 12/2011 | |
| CN | 102312159 | A | 1/2012 | |
| CN | 102703796 | A | 10/2012 | |
| CN | 103388108 | A | 11/2013 | |
| CN | 104703760 | A | 6/2015 | |
| CN | 104140185 | B | 1/2017 | |
| CN | 108136566 | A | 6/2018 | |
| CN | 108406161 | A | 8/2018 | |
| DE | 198 15 087 | A1 | 10/1999 | |
| DE | 100 02 738 | A1 | 7/2001 | |
| DE | 103 48 805 | A1 | 6/2005 | |
| DE | 10 2017 205 682 | A1 | 10/2018 | |
| EP | 2892690 | B1 | 12/2016 | |
| JP | H6-58218 | A | 3/1994 | |
| JP | 2000328204 | A | 11/2000 | |
| JP | 2002317203 | A | 10/2002 | |
| JP | 2011056616 | A | 3/2011 | |
| JP | 2012194651 | A | 10/2012 | |
| JP | 2015-532893 | A | 11/2015 | |
| TW | I476071 | B | 3/2015 | |
| TW | I483813 | B | 5/2015 | |
| WO | WO-9400275 | A1 * | 1/1994 | B24C 11/00 |
| WO | WO-9951399 | A1 * | 10/1999 | B22F 1/0007 |
| WO | 2017150655 | A1 | 9/2017 | |

OTHER PUBLICATIONS

Vulkan "Grittal GH" Cited in IDS of Apr. 20, 2022 (Year: 2015).*
International Search Report issued Mar. 3, 2021 for PCT /EP2020/084384.
Vulkan "Grittal GH", Oct. 1, 2015 (Oct. 1, 2015), Retrieved from the Internet: https://www.vulkan-inox.de/index.php/en/Grittal-GH.html ?file=files/theme- files/downloads/Datenblaetter/Datenblatt%20GRITTAL%20GH%20EN.pdf [retrieved on Feb. 9, 2021] XP055773818 the whole document.
Yu, Cunye "Analysis of surface treatements for stainless steel equipment and parts"; China Academic Journal Electronic Publishing Housem 1994-2004.
Peckner, Donald "Handbook of Stainless Steels", Mc Graw-Hill Book Company, USA 1977.

(Continued)

*Primary Examiner* — Alexandra M Moore
(74) *Attorney, Agent, or Firm* — Schmeiser, Olsen & Watts LLP

(57) ABSTRACT

An abrasive for jet cutting including particles of a stainless steel is provided, the stainless steel includes a microstructure, the microstructure including at least martensite, in a range of ≥20 wt. % to ≤100 wt. %, austenite in a range of ≥0 wt % to ≤50 wt %, and chromium carbide, chromium nitride and/or mixtures thereof, together in a range of ≥0 wt % to ≤45 wt % based on the microstructure, the proportions being selected such that together they amount to ≤100 wt % based on the microstructure. The abrasives for jet cutting exhibit particularly good lifetime and recyclability. Also provided is a suspension for jet cutting including at least the proposed abrasive for jet cutting and a suspending agent, as well as the use of the abrasive for jet cutting for cutting a workpiece.

19 Claims, 3 Drawing Sheets

(56) References Cited

OTHER PUBLICATIONS

Handbook of Materials Testing in Mechanical Engineering: Corrosion and Tribology Vol./Edited by the Science and Technology and Quality Supervision Department of the Ministry of Machinery Industry and the Physical and Chemical Testing Branch of the Chinese Mechanical Engineering Society.—Shenyang: Liaoning Science and Technology Press, May 2002.

Peng; "A preliminary study on the generation mechanism of delayed crack defects and preventive measures for thick specification wear-resistant steel plate cutting"; Wide and Heavy Plate; vol. 22, No. Aug. 4, 2016.

* cited by examiner

ABRASIVE FOR JET CUTTING

CROSS-REFERENCE TO RELATED APPLICATIONS

This application claims priority to PCT Application No. PCT/EP2020/084384, having a filing date of Dec. 3, 2020, based on German Application No. 10 2019 133 017.3, having a filing date of Dec. 4, 2019, the entire contents both of which are hereby incorporated by reference.

FIELD OF TECHNOLOGY

The following relates to an abrasive for jet cutting, a suspension for jet cutting, and the use of the abrasive for jet cutting.

BACKGROUND

Jet cutting is known and used for cutting or cutting through various materials. Jet cutting is not assigned to any manufacturing process standard, but due to the removal principle it is readily classified in DIN 8200 under the generic term “blasting” or “blast chipping”. However, depending on the stresses involved, a distinction must be made between the various blasting systems and it cannot be compared with the classic blasting process for surface finishing. The main differences lie in the velocities of the abrasive that is directed onto the surface. In the case of classical surface finishing, these are up to 160 m/s; in comparison with jet cutting, abrasive velocities of ≥500 m/s and more are achieved. In addition, significant differences lie in the angle of impact of the abrasive on the surface of the blasting material. In the classical blasting processes for surface treatment, flat angles or angles smaller than 90° are aimed for in order to achieve as little rebound effect as possible, as well as abrasion through, micro-chipping of the surface. Compared to abrasive blasting, the abrasive is directed onto the surface at an angle of 90° and causes impact or rebound wear, which leads to erosion removal. The abrasives used for material separation must withstand much higher demands than those required for the classic blasting processes used for surface finishing. These are due to the high impact velocities and the associated impact stress. Furthermore, the abrasive must erode the material surface directly and show almost no rebound effects. Compared to other cutting methods such as laser beam cutting or plasma cutting, jet cutting is a non-thermal cutting process. In addition to dry jet cutting, water-jet cutting, in which water is directed through a nozzle at high pressure onto the material and erodes it, is particularly widespread. To improve the cutting performance and quality of the cut, abrasives can be added to the cutting process in dry jet cutting and waterjet cutting. Abrasives can be different materials with high hardness.

Garnets, olivine sand or corundum are usually added to the process as the main application abrasive. The advantage of these garnets, olivine sand or corundum is that they naturally have a high hardness of 6.5-9 Mohs, which corresponds to about 1120-2060 H V. Furthermore, these minerals are, among other things, in a cubic lattice with a hexakisoctahedral structure. This results in these minerals having a sharp splintery/angular shape, which find application for stock removal and cutting processes with good performance.

Due to the high hardness, however, these materials are very brittle and susceptible to impact and pressure stress, which means that, as an example, the garnet breaks very quickly in the application and can only be reused with increased effort or there is a high loss due to breaking. The reusability of garnet is usually 2 to a maximum of 3 cycles.

Abrasives can therefore still offer potential for improvement. Potential for improvement can be found in lifetime and recyclability.

SUMMARY

An aspect relates to improved abrasives for jet cutting.

Embodiments of the invention propose an abrasive for jet cutting comprising particles of a stainless steel, the stainless steel consisting of a microstructure, the microstructure comprising at least:

- Martensite, particularly in a range of ≥20 wt % to ≤100 wt %,
- Austenite in a range of ≥0 wt. % to ≤50 wt. %; and
- Chromium carbide, chromium nitride and/or mixtures thereof, together in a range of ≥0 wt % to ≤45 wt %,
- based on the microstructure, the proportions being selected such that they together amount to ≤100 wt. % based on the microstructure.

For the purposes of embodiments of the present invention, an “abrasive” means an auxiliary material that can be added to the jet cutting agent to improve the cutting performance of the jet cutting.

For the purposes of embodiments of the present invention, “steel” means a material consisting largely of iron.

For the purposes of embodiments of the present invention, the term “stainless” is to be understood to mean the property of being substantially inert to reactions with the environment and/or natural atmospheres. More particularly, stainless steel is to be understood as steel which does not react substantially with ambient air and/or atmospheric moisture under normal conditions.

For the purposes of embodiments of the present invention, “microstructure” means the microstructure of the steel, i.e., in particular the composition of the steel from a plurality of partial volumes, each of which is homogeneous to a first approximation in terms of its composition and the spatial arrangement of its building blocks with respect to a stationary axial cross placed in the material.

For the purposes of embodiments of the present invention, “martensite” means steel having a martensite structure. For the purposes of embodiments of the present invention, this is to be understood as the metastable modification of steel in a tetragonally distorted space-centered lattice, which forms during the production of steel during cooling, by falling below the martensite starting temperature via transformation from an austenite structure.

For the purposes of embodiments of the present invention, “austenite” means steel having an austenite structure. For the purposes of embodiments of the present invention, this is understood to mean the metastable modification of steel at room temperature which has a face-centered cubic lattice and is formed during the production of steel at high temperatures and persists through incomplete transformation to martensite during cooling/quenching. For the purposes of embodiments of the present invention, austenite is therefore to be understood as retained austenite.

For the purposes of embodiments of the present invention, “chromium carbide” means precipitates in stainless steel consisting essentially of chromium and carbon. For the purposes of embodiments of the present invention, “chromium nitride” means precipitates in stainless steel consisting essentially of chromium and nitrogen. By mixtures of “chromium carbide" and "chromium nitride" are meant, for the purposes of embodiments of the present inventions, mixtures of precipitates of chromium carbide and precipitates of chromium nitride, as well as precipitates of mixtures of chromium carbide and chromium nitride.

The abrasive for jet cutting described above has improved lifetime and recyclability compared with known abrasives. This means that the environment can be protected. In addition, the abrasive for jet cutting can be used to achieve excellent cuts with good cutting speed during jet cutting. Although the abrasive is metallic, it can be achieved that the abrasive does not rust.

Without being bound to a theory, the martensitic microstructural constituents serve on the one hand to enable a high basic hardness of around 800 HV and to achieve a certain brittleness, which leads to a sharp, angular structure similar to a garnet when grains are crushed, to achieve good cutting retention and stock removal. Austenite, chromium carbide and chromium nitride can optionally further improve the properties of martensite in this process.

Further without being bound to a theory, the austenite is advantageous for the stress in the cutting process, because further advantages can be achieved by this microstructure in connection with the other microstructural constituents compared to garnets. The austenite is present in a metastable state and, when subjected to stresses such as those caused by high pressures or deformation in the cutting process, can first harden and, above a certain limit, be converted into stress-indexed martensite. Due to its face-centered cubic lattice, an austenitic microstructure is highly ductile and brings with it excellent toughness and can absorb and resist impact stress very well. As a result, when the abrasive of embodiments of the invention comprises austenite and is stressed, the abrasive is better able to absorb the high impact/impact and compressive stress due to the residual austenite present. As a result, the material does not necessarily break brittle, but continues to harden until the retained austenite is converted to martensite, at which point it can deteriorate to an embrittled state. However, this is only the case after multiple cycles of reuse. The optionally desired austenite can cause a slight and steady increase in the hardening of the abrasive due to the stress during jet cutting, so that the cutting retention remains stable over several cycles without any loss in the quality of the cut.

Further without being bound to a theory, the optionally present chromium carbide and/or chromium nitride further improve the abrasive's durability, cutting retention and recyclability. These microstructural components can provide even further improved wear resistance. Furthermore, the hardness of the abrasive can be further improved by chromium carbides and/or chromium nitrides.

Due to the rust-free nature of the abrasive, it is advantageous that no rust inhibitor has to be added to the suspension when the abrasive is used in a suspension for jet cutting. This can protect the environment and simplify the processing of the resulting suspensions.

The microstructural composition described above can be influenced by the chemical composition of the stainless steel and optionally by a heat treatment of the steel.

In one embodiment, it may be provided that the martensite at least partially comprises intermediate structures. Accordingly, it may be provided that by martensite is also meant a mixture of martensite and intermediate structure. For the purposes of embodiments of the present invention, "intermediate structure" is to be understood as the structure also known by the name bainite, which can be formed during cooling of austenite.

In an embodiment, it can be provided that the proportions of the microstructure described above are selected in such a way that they together amount to 100 wt. % based on the microstructure.

In an embodiment, the abrasive can be provided with other abrasives in addition to the stainless-steel particles, for example metallic or mineral abrasives. This allows the cutting properties and/or wear properties to be adjusted.

In an embodiment, it can be provided that the abrasive for jet cutting comprises the particles of stainless steel in a range of ≥95 wt. % to ≤100 wt. %, based on the total weight of the abrasive for jet cutting, particularly from ≥98 wt. % to ≤100 wt. %. This enables the abrasive to exhibit particularly homogeneous cutting properties and/or wear properties.

In an embodiment, it may be provided that the microstructure comprises chromium carbide, chromium nitride and/or mixtures thereof together in a range of ≥3 wt % to ≤35 wt % based on the microstructure, ≥10 wt % to ≤30 wt %, in particular ≥24 wt % to ≤28 wt %.

This can result in the abrasive having further improved wear resistance or cutting retention. Furthermore, it can be achieved that the abrasive has a particularly high hardness. Chromium carbides, chromium nitrides and/or mixtures thereof can be used in the above-described range to simultaneously achieve a sufficiently high hardness and sufficiently good wear resistance or cutting retention.

In an embodiment, it may be provided that the microstructure comprises chromium carbide in a range of ≥3 wt % to ≤35 wt % based on the microstructure, ≥10 wt % to ≤30 wt %, in particular ≥24 wt % to ≤28 wt %. In an alternative preferred embodiment, it may be provided that the microstructure comprises chromium nitride in a range of ≥3 wt % to ≤35 wt % based on the microstructure, ≥10 wt % to ≤30 wt %, in particular ≥24 wt % to ≤28 wt %.

In an embodiment, it may be provided that the microstructure comprises austenite in a range of ≥5 wt % to ≤47 wt % based on the microstructure, ≥15 wt % to ≤40 wt %, in particular ≥25 wt % to ≤35 wt %.

This can ensure that the abrasive has particularly good wear properties. In particular, it can be achieved that the abrasive has sufficient impact strength or impact resistance so that it does not break quickly. At the same time, the austenite content described above can ensure that the hardness of the abrasive is not excessively impaired.

In an embodiment, it may be provided that the microstructure comprises martensite in a range of ≥15 wt % to ≤75 wt % based on the microstructure, ≥18 wt % to ≤72 wt %.

In an embodiment, it may be provided that the microstructure consists of:

Martensite in a range of ≥18 wt % to ≤72 wt %,
Austenite in a range of ≥5 wt. % to ≤47 wt. %, and.
Chromium carbide, chromium nitride and/or mixtures thereof, together in a range of ≥3 wt % to ≤35 wt %,
based on the microstructure, the proportions being selected such that they together amount to ≤100 wt. % based on the microstructure.

In an embodiment, it may be provided that the stainless steel consists of an alloy comprising:

Chromium in a range of ≥10 wt % to ≤35 wt %,
Molybdenum in a range of ≥0 wt % to ≤3 wt %,
Nickel in a range of ≥0 wt % to ≤1 wt %,
Carbon in a range of ≥0 wt % to ≤2.5 wt %,
Nitrogen in a range of ≥0 wt % to ≤2.5 wt %,
Trace elements in a range of ≥0 wt. % to ≤1 wt. %, and
Balance iron, based on the alloy, the alloy comprising carbon and nitrogen together in a range of ≥0.2 wt % to ≤2.5 wt % based on the alloy.

This means that the microstructural composition according to embodiments of the invention can be set particularly easily. For example, it can be achieved that the microstructural composition according to embodiments of the invention is already obtained after cooling a steel casting with the elemental composition described above. In addition, it can be achieved that the microstructural composition can be further adjusted within the claimed range by a downstream heat treatment. It can be achieved that a steel with the aforementioned composition is provided by a casting and directly after cooling and/or after a heat treatment has the structural composition according to embodiments of the invention. Thus, a particularly good manufacturability of the abrasive can be achieved by the composition of the steel as described above.

It is to be understood that common impurities are included in the composition. In an embodiment, it may be provided that the alloy consists of the above-described constituents.

In an embodiment, it may be provided that the alloy comprises carbon and nitrogen together in a range of ≥0.6 wt % to ≤2.5 wt % based on the alloy, ≥0.8 wt % to ≤2.3 wt %, more ≥1.2 wt % to ≤2.1 wt %, in particular ≥1.8 wt % to ≤2 wt %.

This means that the proportion of chromium carbide, chromium nitride and mixtures thereof can easily be kept within an advantageous range. Thus, it can be achieved that the abrasive has a particularly good wear resistance or cutting retention with simultaneously particularly high hardness.

In an embodiment, it may be provided that the alloy comprises chromium in a range of ≥15 wt % to ≤33 wt % based on the alloy, ≥20 wt % to ≤31 wt %, in particular ≥25 wt % to ≤30 wt %.

It can be achieved by the aforementioned chromium content that the steel is sufficiently stainless. Furthermore, it can be achieved that the proportion of chromium carbide, chromium nitride and mixtures thereof can be easily kept within an advantageous range. Thus, it can be achieved that the abrasive has a particularly good wear resistance or cutting retention while at the same time having a particularly high hardness. It is understood that the stainless steel may comprise chromium, carbon and/or nitrogen without necessarily comprising chromium carbides and/or chromium nitrides in the sense of embodiments of the present invention.

In an embodiment, it may be provided that the stainless steel consists of an alloy comprising:

Chromium in a range of ≥10 wt % to ≤35 wt %,
Carbon in a range of ≥0 wt % to ≤2.5 wt %,
Nitrogen in a range of ≥0 wt % to ≤2.5 wt %,
Trace elements in a range of ≥0 wt. % to ≤1 wt. %, and
Balance iron,
based on the alloy, the alloy comprising carbon and nitrogen together in a range of ≥0.2 wt % to ≤2.5 wt % based on the alloy.

In an embodiment, it may be provided that the stainless steel consists of an alloy comprising:

Chromium in a range of ≥10 wt % to ≤35 wt %,
Carbon in a range of ≥0 wt % to ≤2.5 wt %,
Nitrogen in a range of ≥0 wt. % to ≤2.5 wt. %, and
Balance iron,
based on the alloy, the alloy comprising carbon and nitrogen together in a range of ≥0.2 wt % to ≤2.5 wt % based on the alloy.

In an embodiment, it may be provided that the stainless steel consists of an alloy comprising:

Chromium in a range of ≥10 wt % to ≤35 wt %,
Carbon in a range of ≥0.2 wt % to ≤2.5 wt %,
Trace elements in a range of ≥0 wt. % to ≤1 wt. %, and
Balance iron,
based on the alloy.

In an embodiment, it may be provided that the stainless steel consists of an alloy comprising:

Chromium in a range of ≥10 wt % to ≤35 wt %,
Carbon in a range of ≥0.2 wt. % to ≤2.5 wt. %, and
Balance iron,
based on the alloy.

In an alternative embodiment, it may be provided that the stainless steel is made of an alloy comprising:

Chromium in a range of ≥10 wt % to ≤35 wt %,
Molybdenum in a range of ≥0.5 wt % to ≤1.5 wt %,
Carbon in a range of ≥1.1 wt % to ≤2.4 wt %,
Nitrogen in a range of ≥0.1 wt. % to ≤0.4 wt. %, and
Balance iron,
based on the alloy, the alloy comprising carbon and nitrogen together in a range of ≥1.5 wt % to ≤2.5 wt % based on the alloy.

In an embodiment, it may be provided that the stainless steel consists of an alloy comprising:

Chromium in a range of ≥10 wt % to ≤35 wt %,
Molybdenum in a range of ≥0.5 wt % to ≤1.5 wt %,
Carbon in a range of ≥1.5 wt % to ≤2.0 wt %,
Nitrogen in a range of ≥0.2 wt. % to ≤0.3 wt. %, and
Balance iron,
based on the alloy, the alloy comprising carbon and nitrogen together in a range of ≥1.8 wt % to ≤2.2 wt % based on the alloy.

In an alternative embodiment, it may be provided that the stainless steel is made of an alloy comprising:

Chromium in a range of ≥10 wt % to ≤35 wt %,
Carbon in a range of ≥1.1 wt % to ≤2.4 wt %,
Nitrogen in a range of ≥0.1 wt. % to ≤0.4 wt. %, and
Balance iron,
based on the alloy, the alloy comprising carbon and nitrogen together in a range of ≥1.5 wt % to ≤2.5 wt % based on the alloy.

In an embodiment, it may be provided that the stainless steel consists of an alloy comprising:

Chromium in a range of ≥10 wt % to ≤35 wt %,
Carbon in a range of ≥1.5 wt % to ≤2.0 wt %,
Nitrogen in a range of ≥0.2 wt. % to ≤0.3 wt. %, and
Balance iron,
based on the alloy, the alloy comprising carbon and nitrogen together in a range of ≥1.8 wt % to ≤2.2 wt % based on the alloy.

In an alternative embodiment, it may be provided that the stainless steel is made of an alloy comprising:

Chromium in a range of ≥10 wt % to ≤35 wt %,
Molybdenum in a range of ≥0.5 wt % to ≤1.5 wt %,
Carbon in a range of ≥1.0 wt. % to ≤2.5 wt. %, and
Balance iron,
based on the alloy.

In an embodiment, it may be provided that the stainless steel consists of an alloy comprising:

Chromium in a range of ≥10 wt % to ≤35 wt %,
Molybdenum in a range of ≥0.5 wt % to ≤1.5 wt %,
Carbon in a range of ≥1.7 wt. % to ≤2.2 wt. %; and
Balance iron,
based on the alloy.

In an embodiment, it may be provided that the stainless steel particles have an equivalent diameter $D_{90}$ in a range of ≥0.01 mm to ≤1 mm, ≥0.05 mm to ≤0.4 mm, in particular ≥0.09 mm to ≤0.315 mm, alternatively ≥0.01 mm to ≤0.5 mm, in particular ≥0.01 mm to ≤0.2 mm.

For the purposes of the present, "equivalent diameter" is understood to mean that a sphere with the same diameter has the same diameter-specific properties. In particular, the equivalent diameter is understood to be the equivalent diameter determined by sieving according to DIN 66165-2: 2016-08. For the purposes of embodiments of the present invention, the "equivalent diameter $D_{90}$" is understood to mean that 90% by weight of a sample has an equivalent diameter which is smaller than or equal to the "equivalent diameter $D_{90}$".

With particles in the equivalent diameter range described above, it can be achieved that the abrasive can be suspended well and can be used in a particularly thin cutting jet. Furthermore, a particularly good tool life and cutting performance can be achieved with such particles.

In an embodiment, it may be provided that the stainless-steel particles have a hardness in a range from ≥600 HV 0.2 to ≤1000 HV 0.2, from ≥700 HV 0.2 to ≤900 HV 0.2, in particular from ≥780 HV 0.2 to ≤830 HV 0.2. In particular, the hardness is measured according to DIN EN ISO 6507-1:2018-07.

Compared with the abrasives known to be used, the abrasive presented here is characterized by a tough base matrix with hard carbides. The good toughness properties enable it to withstand high impact and pressure stress, which occur when the abrasive meets the high-pressure water jet and when the abrasive strikes the material surface. Due to the hardness described above and the carbides present, it can be achieved that the abrasive produces a particularly good cutting performance. At the same time, it can be achieved that the abrasive, due to the microstructure composition, decomposes only after several cycles of use compared to abrasives with similar hardness. As a result, a particularly good reusability of the abrasive can be achieved.

In an embodiment, it may be provided that the abrasive has a bulk density in a range from ≥3.5 g/cm$^3$ to ≤5 g/cm$^3$, from ≥3.6 g/cm$^3$ to ≤4.0 g/cm$^3$. In particular, the bulk density is measured according to DIN ISO 697:1984-01.

In an embodiment, it may be provided that the particles are selected from shot, wire grain, grit, and mixtures thereof, wherein the particles are grit.

In this context, "shot" within the meaning of embodiments of the present invention is to be understood as essentially spherical particles. By "wire grain" in the sense of embodiments of the present invention is to be understood essentially cylindrical particles. Further, "grit" is understood to mean substantially angular and irregular particles.

Particularly good cutting performance can be achieved with the particles described above. It has been found that with grit a particularly good cutting performance can be achieved by the abrasive.

Embodiments of the invention further propose a suspension for jet cutting, the suspension comprising at least one abrasive for jet cutting as described above and a suspending agent, water.

In an embodiment, it may be provided that the suspension comprises the suspending agent, in particular the water, and the abrasive in a weight ratio of the suspending agent to the abrasive in a range from greater than or equal to 9:1 to less than or equal to 23:1, from greater than or equal to 11:1 to less than or equal to 19:1, more from greater than or equal to 12 to less than or equal to 16:1, particularly from greater than or equal to 13.5:1 to less than or equal to 14.5:1.

This means that the cutting speed can be adjusted particularly well during jet cutting with the suspension and high cutting performance can be achieved.

In an embodiment, it may be provided that the suspension does not contain a rust inhibitor.

This makes it possible to process the suspension in an environmentally friendly manner.

In an embodiment, it may be provided that the suspension comprises an additive, an additive for stabilizing the suspension. In an embodiment, it may be provided that the additive comprises a polymer, a homopolymer, particularly starch.

In an embodiment, it may be provided that the suspension comprises water as a suspending agent and starch as an additive, in a weight ratio of water to starch in a range of greater than or equal to 120:2 to less than or equal to 120:0.5, for example 120:1.

Further, embodiments of the invention propose the use of a pre-described abrasive for jet cutting for cutting a workpiece. By this it is meant that the pre-described abrasive is used for jet cutting by guiding it at high speed onto a workpiece to be cut, thereby cutting the workpiece by micro-chipping.

In an embodiment, it can be provided that the abrasive is used in a suspension as described above at a working pressure in a range from greater than or equal to 1000 bar to less than or equal to 6000 bar, greater than or equal to 3000 bar to less than or equal to 6000 bar.

Particularly good cutting performance can be achieved at the working pressures described above. Surprisingly, it was shown that the abrasive has a particularly high reusability when used at these working pressures, despite its high hardness, compared to known abrasives for jet cutting.

In an embodiment, it may be provided that the abrasive is used with a velocity on impact with the workpiece in a range of greater than or equal to 500 m/s to less than or equal to 600 m/s, greater than or equal to 550 m/s to less than or equal to 650 m/s.

Surprisingly, it could be shown that when impacting the workpiece at the pre-described speed, the pre-described abrasive provides good cutting performance and at the same time allows good recyclability. It was shown that when the abrasive is impacted at the pre-described speed, it withstands the high impact or pressure stress and the properties, and in particular the grain size, remain stable over several cycles without degrading the quality of the cut.

Further advantages of the abrasive for jet cutting according to embodiments of the invention are illustrated by the examples and figures and explained in the following description. It should be noted that the examples and figures are descriptive only and are not intended to limit embodiments of the invention in any way.

Example 1

An abrasive for jet cutting was provided. It comprised particles of a stainless steel. The stainless steel consisted of a microstructure, the microstructure comprising 72 wt % martensite, 25 wt % austenite and 3 wt % chromium carbide. The stainless steel consisted of an alloy comprising 0.8 wt % carbon, 15 wt % chromium and balance iron. It had a hardness in the range of 600-740 HV. The abrasive exhibited good cutting properties and good toughness. Compared to garnet, the abrasive of Example 1 also exhibited good wear properties or cutting retention. Without being bound to a theory, good cutting properties could be achieved due to the high martensite content, but the wear properties were lower compared to abrasives with higher chromium carbide content.

Example 2

An abrasive for jet cutting was provided. It comprised particles of a stainless steel. The stainless steel consisted of a microstructure comprising 44 wt % martensite, 30 wt % austenite and 26 wt % chromium carbide. The stainless steel consisted of an alloy comprising 2 wt % carbon, 30 wt % chromium and balance iron. It had a hardness around 800 HV. The abrasive had good cutting properties and good toughness. Compared to garnet and the other examples, the abrasive from example 2 had the best wear properties with very good cutting properties.

Example 3

An abrasive for jet cutting was provided. It comprised particles of a stainless steel. The stainless steel consisted of a microstructure comprising 18 wt % martensite, 47 wt % austenite and 35 wt % chromium carbide. The stainless steel consisted of an alloy comprising 2.5 wt % carbon, 35 wt % chromium and balance iron. It had a hardness of 800-850 HV. The abrasive still exhibited good cutting properties and good toughness. Compared to garnet, the abrasive from Example 3 also exhibited good wear properties or cutting retention. Without being bound to a theory, good toughness properties could be expected due to the comparatively high austenite content, but these could hardly compensate for the poor toughness properties of the high chromium carbide content, which is why poorer results were achieved overall than with the abrasive from Example 2.

Comparative Example

Garnet was used as the abrasive of the comparative example.

Lifetime Test

The abrasive from Example 2 and the comparative example were subjected to a jet cutting test to compare their properties. A suspension of the respective abrasive, water and starch was prepared and blasted onto a 20 mm thick plate of V2A steel. Jet cutting was performed at good cutting quality with a cutting speed of 25 mm/min, sample thickness of 20 mm, cut width of 1.0 mm, new grain of 300 g/min, cut length of 400 mm, a distance of the nozzle to the surface of the sample of 7 mm and a pressure of 3200 bar at a flow of 3053 L/min. The abrasive was collected and fractionally sieved after each cycle so that a sieve distribution was obtained that reflected an equivalent diameter distribution. The abrasive was then returned to the jet cutter and used for a next cycle.

BRIEF DESCRIPTION

Some of the embodiments will be described in detail, with reference to the following figures, wherein like designations denote like members, wherein.

DETAILED DESCRIPTION

Figure 1:
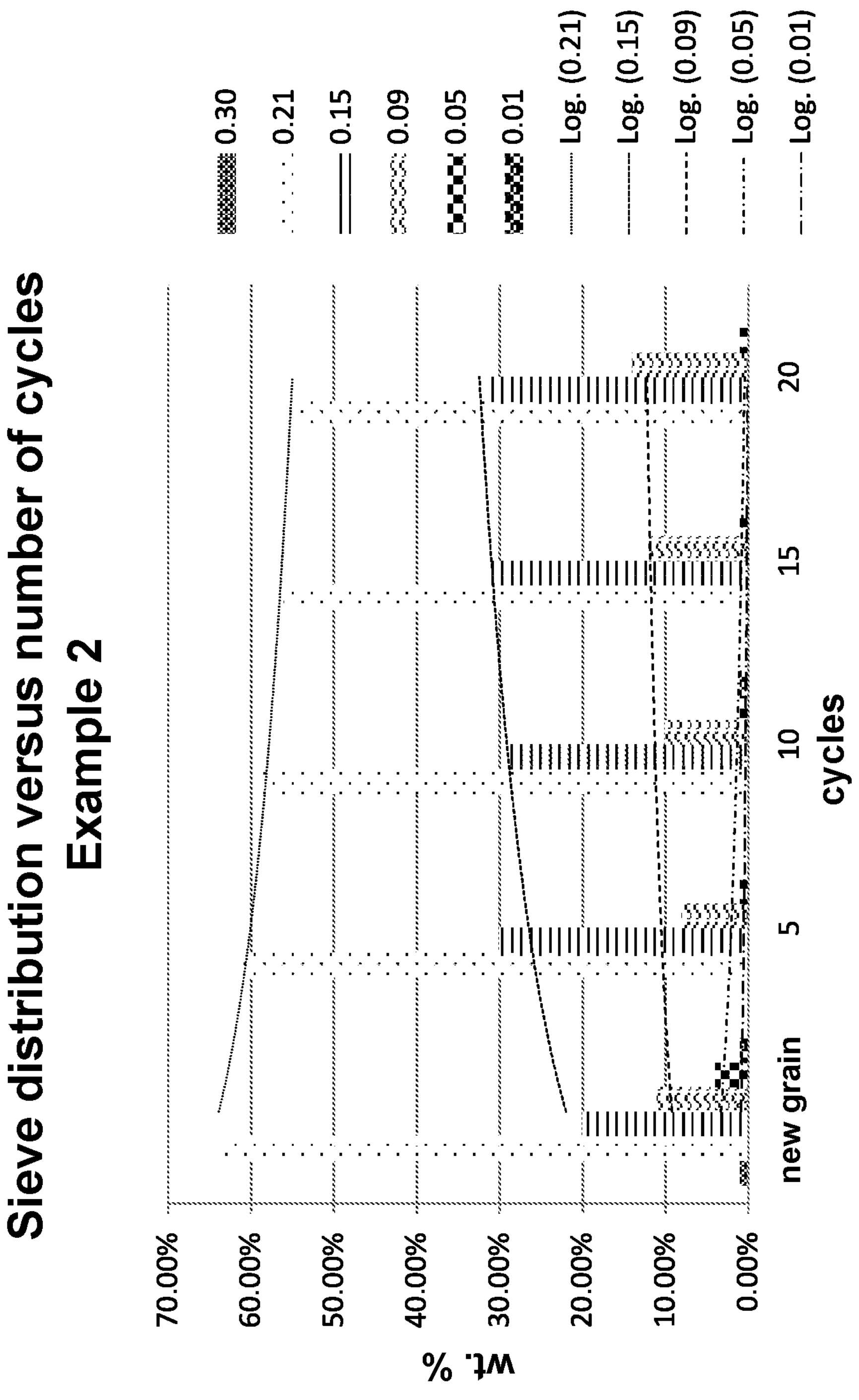
FIG. 1 shows the sieve distribution in wt % versus the number of cycles of the life test of an abrasive according to Example 2 in the range from 0 to 20 cycles.
Figure 2:
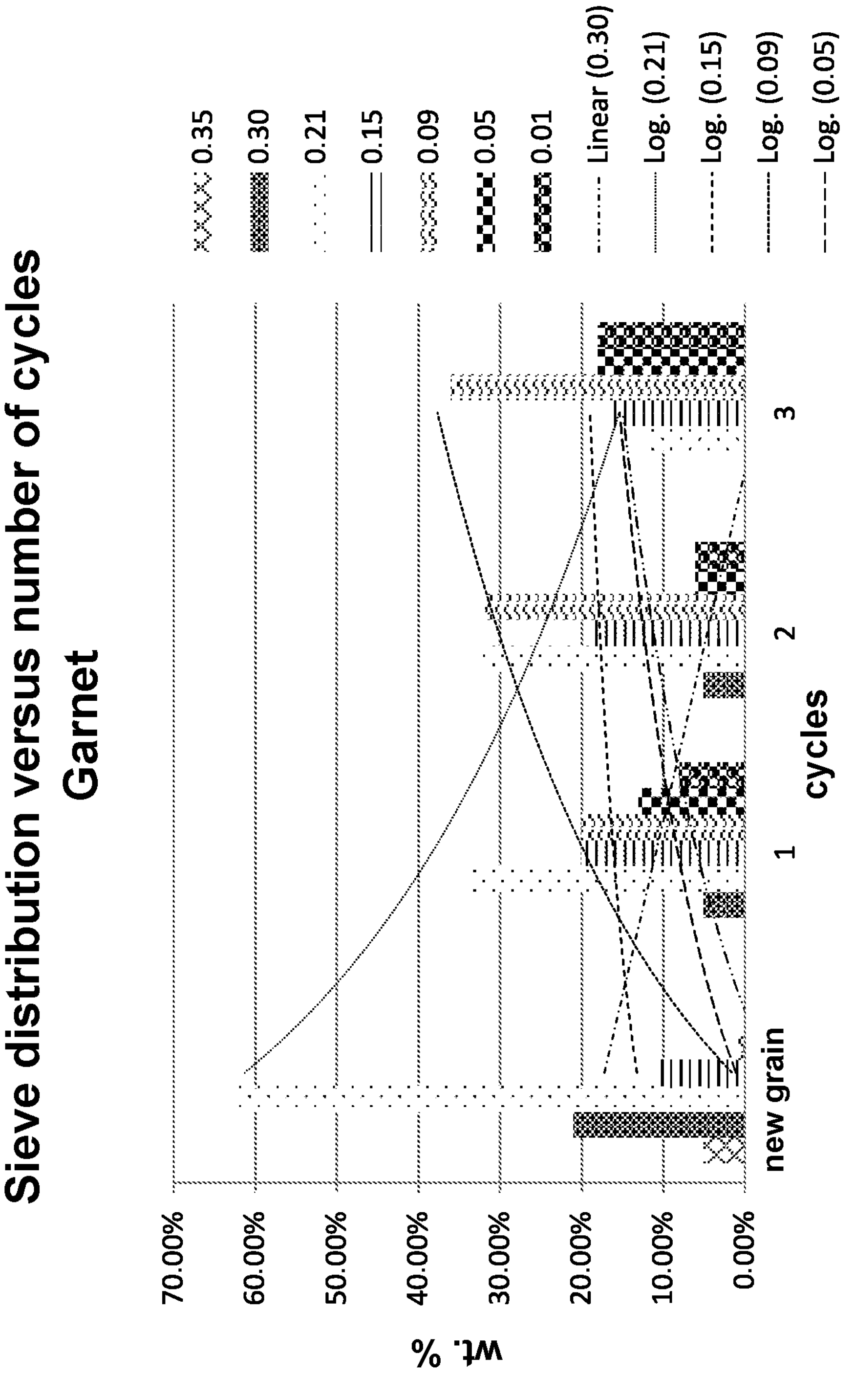
FIG. 2 shows the sieve distribution in wt. % versus the number of cycles of the life test of an abrasive according to the comparative example.
Figure 3:
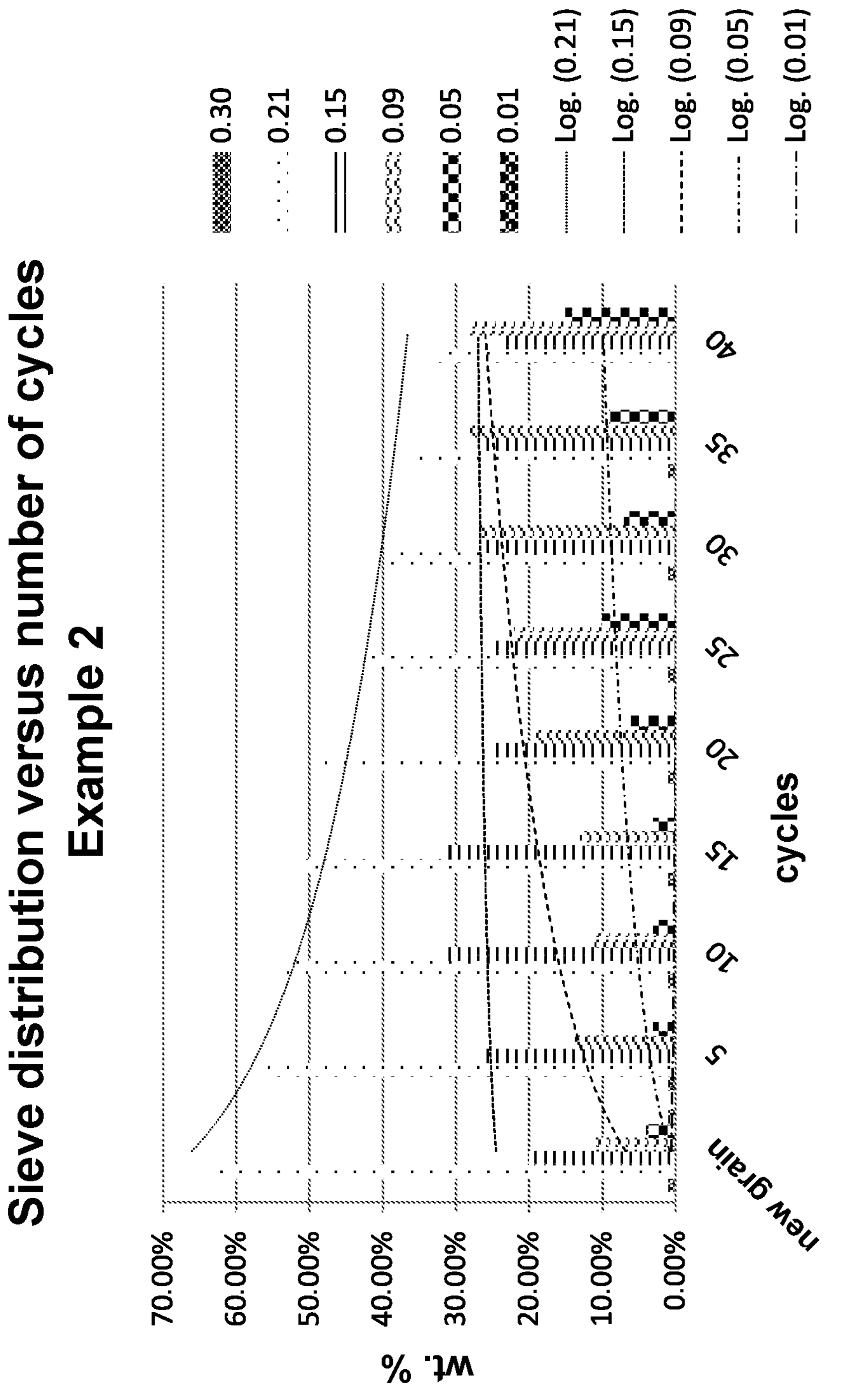
FIG. 3 shows the sieve distribution in wt % versus the number of cycles of the life test of an abrasive according to Example 2 in the range from 0 to 40 cycles.

FIGS. 1 to 3 show the results of the lifetime test for example 2 and the comparative example. For example 2, the corresponding weight fractions in % of the sieve fractions are shown as histograms for every 5 cycles. For the comparative example, the corresponding weight fractions in % of the sieve fractions were given for the first 3 cycles. The mesh sizes of the sieves used for fractioning during sieving are given in mm. Furthermore, logarithmic curves have been fitted to the measured data for the most prominent fractions and are shown as dashed lines.

Example 2 and the comparative example showed as new grain the sieve fraction with 0.21 mm mesh size as the largest fraction with more than 60 wt. %.

It can be seen from FIG. 1 that the fraction from 0.21 mm mesh size of the abrasive according to Example 2 hardly decreases and even after 20 cycles still accounts for about 55 wt. % of the screening fractions.

The comparable lifetime test for garnet according to the comparative example, shown in FIG. 2, showed that after only one cycle the fraction of 0.21 mm mesh size had already dropped to below 35% by weight. After 3 cycles, this fraction accounted for only slightly more than 10% by weight, which is why this abrasive could no longer be used after only 3 cycles.

FIG. 3 shows an extended lifetime test for the abrasive according to example 2. Even after 40 cycles, the fraction of 0.21 mm mesh size still accounts for the largest proportion and the abrasive can still be used accordingly.

As a result, the abrasives according to embodiments of the invention show significantly improved lifetime and recyclability compared to known abrasives.

Although the present invention has been disclosed in the form of preferred embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements. The mention of a “unit” or a “module” does not preclude the use of more than one unit or module.

The invention claimed is:

1. An abrasive for jet cutting comprising particles of a stainless steel, the stainless steel consisting of a microstructure, the microstructure consisting of:

martensite in a range of ≥20 wt % to ≤95 wt %, austenite in a range of ≥5 wt. % to ≤50 wt. %; and chromium carbide, chromium nitride and/or mixtures thereof, together in a range of ≥0 wt % to ≤45 wt %, based on the microstructure, the proportions being selected such that they together amount to ≤100 wt. % based on the microstructure.

2. The abrasive for jet cutting according to claim 1, wherein the microstructure comprises chromium carbide, chromium nitride and/or mixtures thereof together in a range of ≥3 wt % to ≤35 wt % based on the microstructure.

3. The abrasive for jet cutting according to claim 1, wherein the microstructure comprises chromium carbide, chromium nitride and/or mixtures thereof together in a range of ≥10 wt % to ≤30 wt % based on the microstructure.

4. The abrasive for jet cutting according to claim 1, wherein the microstructure comprises austenite in a range of ≥5 wt % to ≤47 wt % based on the microstructure.

5. The abrasive for jet cutting according to claim 1, wherein the microstructure comprises austenite in a range of ≥15 wt % to ≤40 wt % based on the microstructure.

6. The abrasive for jet cutting according to claim 1, wherein the stainless steel is made of an alloy consisting of:
- chromium in a range of ≥10 wt % to ≤35 wt %,
- molybdenum in a range of ≥0 wt % to ≤3 wt %,
- nickel in a range of ≥0 wt % to ≤1 wt %,
- carbon in a range of ≥0 wt % to ≤2.5 wt %,
- nitrogen in a range of ≥0 wt % to ≤2.5 wt %,
- trace elements in a range of ≥0 wt. % to ≤1 wt. %, and
- balance iron,
- based on the alloy, the alloy comprising carbon and nitrogen together in a range of ≥0.2 wt % to ≤2.5 wt % based on the alloy.

7. The abrasive for jet cutting according to claim 6, wherein the alloy comprises carbon and nitrogen together in a range of ≥0.6 wt % to ≤2.5 wt % based on the alloy.

8. The abrasive for jet cutting according to claim 6, wherein the alloy comprises carbon and nitrogen together in a range of ≥0.8 wt % to ≤2.3 wt % based on the alloy.

9. The abrasive for jet cutting according to claim 6, wherein the alloy comprises chromium in a range of ≥15 wt % to ≤33 wt % based on the alloy.

10. The abrasive for jet cutting according to claim 6, wherein the alloy comprises chromium in a range of ≥20 wt % to ≤31 wt % based on the alloy.

11. The abrasive for jet cutting according to claim 1, wherein the stainless steel particles have an equivalent diameter $D_{90}$ in a range of ≥0.01 mm to ≤1 mm.

12. The abrasive for jet cutting according to claim 1, wherein the stainless steel particles have an equivalent diameter $D_{90}$ in a range of ≥0.05 mm to ≤0.4 mm.

13. The abrasive for jet cutting according to claim 1, wherein the stainless steel particles have an equivalent diameter $D_{90}$ in a range of ≥0.01 mm to ≤0.5 mm.

14. The abrasive for jet cutting according to claim 1, wherein the stainless-steel particles have a hardness in a range from ≥600 HV 0.2 to ≤1000 HV 0.2.

15. The abrasive for jet cutting according to claim 1, wherein the stainless-steel particles have a hardness in a range from ≥700 HV 0.2 to ≤900 HV 0.2.

16. The abrasive for jet cutting according to claim 1, wherein the stainless-steel particles have a hardness in a range from ≥780 HV 0.2 to ≤830 HV 0.2.

17. The abrasive for jet cutting according to claim 1, wherein the particles are selected from shot, wire grain, grit, and mixtures thereof.

18. A suspension for jet cutting, comprising at least one abrasive for jet cutting according to claim 1 and a suspending agent.

19. A method comprising:
utilizing an abrasive for jet cutting according to claim 1 for cutting a workpiece.

* * * * *